E. F. BERRY.
DETACHABLE PIPE COUPLING.
APPLICATION FILED MAY 29, 1914. RENEWED OCT. 4, 1916.
1,233,168.
Patented July 10, 1917.
2 SHEETS—SHEET 1.
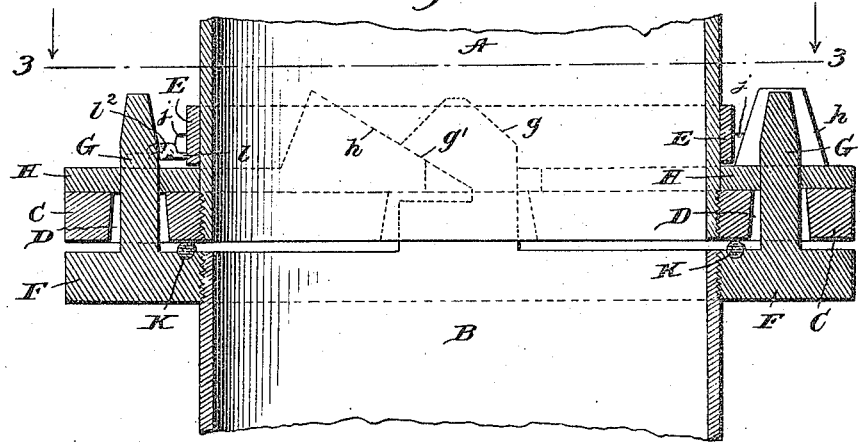
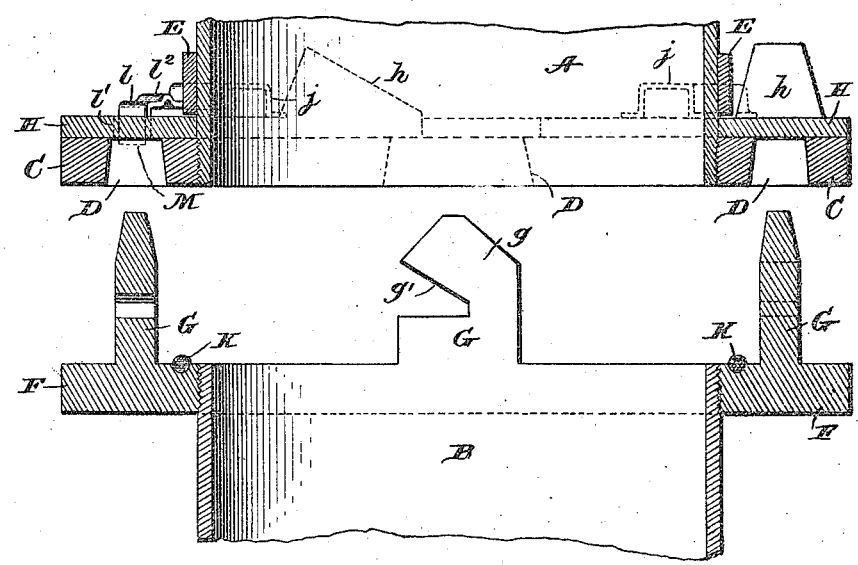
Witnesses:
Jas. E. Hutchinson.
Geo. S. Riley.
Inventor:
Edward F. Berry
By Bacon & Milans, Attorneys.

E. F. BERRY.
DETACHABLE PIPE COUPLING.
APPLICATION FILED MAY 29, 1914. RENEWED OCT. 4, 1916.
1,233,168.
Patented July 10, 1917.
2 SHEETS—SHEET 2.
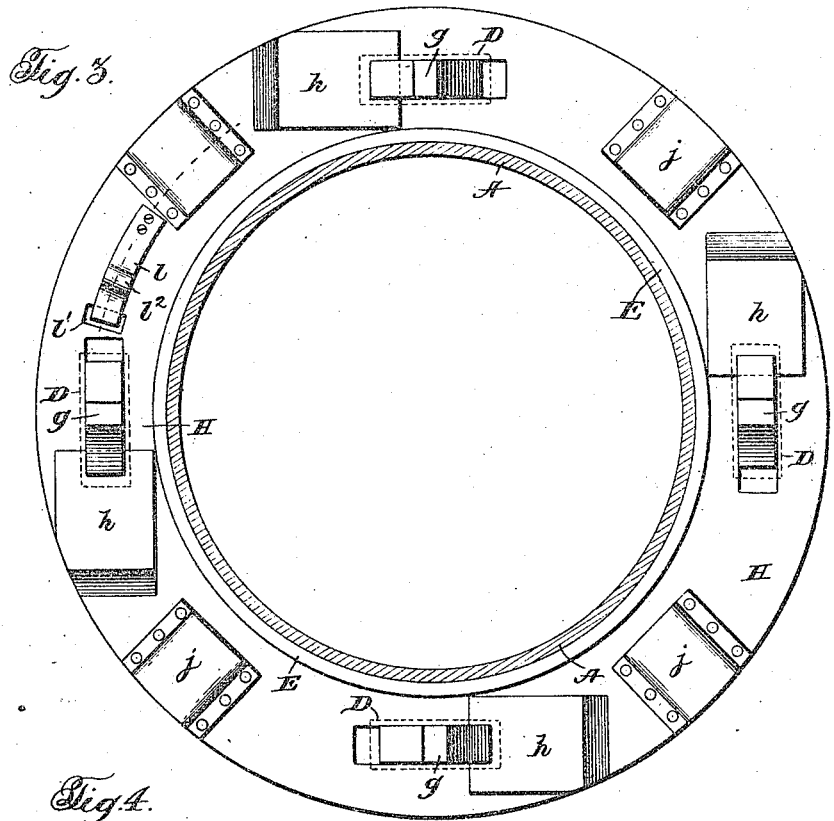
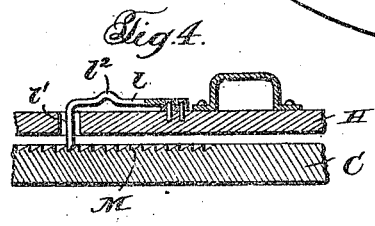
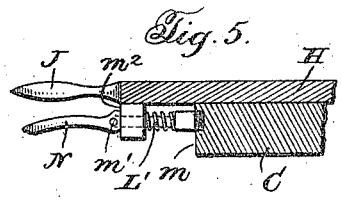
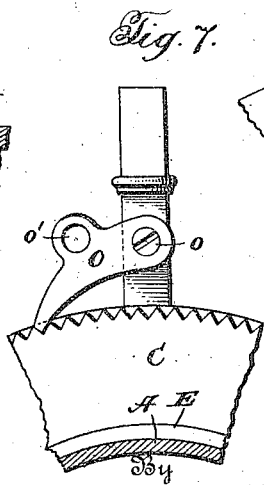
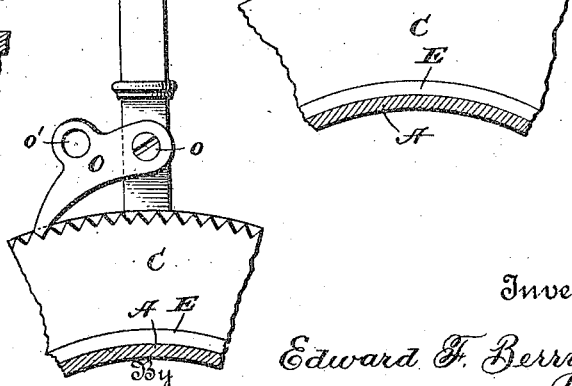
Witnesses:
Jas. E. Hutchinson
Geo. Riley
Inventor:
Edward F. Berry
By Bacon & Milans
Attorneys

UNITED STATES PATENT OFFICE.

EDWARD F. BERRY, OF NEW ORLEANS, LOUISIANA.

DETACHABLE PIPE-COUPLING.

1,233,168.  Specification of Letters Patent.  Patented July 10, 1917.

Application filed May 29, 1914, Serial No. 841,738. Renewed October 4, 1916. Serial No. 123,763.

*To all whom it may concern:*

Be it known that I, EDWARD F. BERRY, a citizen of the United States, residing at New Orleans, in the parish of Orleans and State of Louisiana, have invented certain new and useful Improvements in Detachable Pipe-Couplings, of which the following is a specification, reference being had therein to the accompanying drawing.

This invention relates to improvements in detachable pipe couplings and has for its primary object the provision of a coupling which may be quickly operated and without the use of separate securing means such as bolts which have to be independently manipulated in the coupling or uncoupling operation.

Another object of the invention is to provide improved means enabling the coupling of pipe sections together without the necessity of relatively turning the sections themselves, as distinguished from the turning of the locking member or members of the coupling.

To the end stated, the invention comprehends the provision of a coupling of the general type to which I have alluded, comprising opposing interfitting members adapted to be carried by adjoining pipe sections, and a wedging device adapted to engage one of said members between bearing portions carried thereby, and the other of said members to effect a clamping action between said interfitting members, and a compressing force upon an interposed packing in instances where the latter may be employed.

More especially, the invention embraces a preferred construction possessing the general characteristic just defined consisting of a flange on one pipe section bearing lugs having beveled head portions, and a similar flange carried by the adjoining pipe section provided with openings through which said lugs may be passed, in combination with a ring encircling the last mentioned pipe section and carrying wedges adapted to be circumferentially shifted to interpose its wedges between the beveled heads of the lugs and the adjacent surface of the apertured flange to draw the lugs through the openings in said last mentioned flange, and thereby forcibly create the binding action between the opposite surface thereof and the opposing surface of the flange which bears the lugs, or as above stated, the compressing action on any suitable packing disposed therebetween. Conveniently, a suitable simple interlocking engagement is provided between the circumferentially adjustable wedge ring and the apertured flange to detachably hold the parts in adjusted positions.

The above stated preferred embodiment of the invention includes a number of improved details of construction and arrangement of parts, which will be readily understood from an inspection of the accompanying drawings forming part hereof, and wherein such embodiment is illustrated, when considered in connection with the specific description thereof hereinafter contained.

In the drawings:—

Figure 1 is a longitudinal sectional view through the device in coupled relation;

Fig. 2 is a similar view with the parts in uncoupled position;

Fig. 3 is a transverse sectional view through Fig. 1 on the line 3—3 looking in the direction of the arrow;

Fig. 4 is a sectional view, taken longitudinally of the spring latch, approximately on the dotted line indicated in Fig. 3.

Fig. 5 is a detail view of a modified form of latch, and

Figs. 6 and 7 are views of a still further modified construction of latch and operating handle or lever.

Referring more specifically to the drawings, wherein like reference characters designate corresponding parts in the several views, A represents the end of a pipe section of any character desired to be joined, here shown, for example, as a metallic conduit; and B similarly represents the end portion of an abutting pipe section.

Secured to the end of the pipe section A in any suitable manner, as by riveting or a threaded engagement therewith, I secure a rigid flange C, the same being provided with elongated, conveniently oblong openings D, for a purpose to be hereinafter pointed out, the openings being tapered outwardly or toward the pipe section A, as clearly indicated in the drawings, particularly Figs. 2 and 3. Spaced a suitable distance from this flange C, and for a purpose as will also presently appear, I preferably, though not always necessarily, employ a ring E, fixedly secured to said section, adapted to surround the pipe section A. On the opposite pipe section B, I provide and similarly secure thereto a flange F, quite similar to the flange C, to which I have previously alluded, this flange, however, being provided with a series of lugs G disposed at suitable distances apart around the flange and projecting outwardly therefrom, as shown, these lugs being of substantial width to give adequate body and strength to the structure, and terminating in headed portions $g$ having under beveled or inclined edges $g'$.

When the pipe sections A and B are assembled, the lugs G are introduced into and passed through the openings D of the flange C, the tapered formation of the openings facilitating the operation, and the headed ends $g$ are adapted to be engaged beyond the flange C to clamp the parts together. Such clamping is accomplished through the medium of a loose clamping plate, also in the nature of a ring encompassing the pipe section A, and confined for a freedom of movement between the adjacent face of the flange C and the ring E heretofore mentioned where the latter is used, as will be clear from an inspection of Fig. 1. This clamping plate, designated at H, carries a series of broad wedges $h$, corresponding in number to the lugs G, and being of a width substantially greater than the thickness of the lugs, to always insure engagement between the wedges and lugs, when the clamping plate is swung around circumferentially of the pipe sections, to throw the wedges into engagement with the beveled edges $g'$ of the heads $g$ of the lugs, as will be apparent, it being observed that the wedges $h$ project approximately tangentially of the plate or ring H.

From the foregoing construction, it will be obvious that after the pipe sections are brought together with the lugs G of the flange F and passed through the openings D of the opposite flange C, and with the beveled headed portions $g$ of the lugs beyond the adjacent surface of the flange C, it is then simply necessary to turn the clamping plate H,—as by a manipulation of a suitable approximately radially disposed detachable handle, for example J, separably engaging stirrups $j$ on the exposed face of the clamping plate,—which will force the wedges $h$ of the clamping plate and the beveled portions of the lugs into mutual engagement, effecting the drawing of the pipe sections together to clamp the opposing faces of the flanges C and F in abutting relation, or to compress therebetween a suitable (as rubber) packing K, when such a packing is used.

It is desirable that some means be furnished to lock the clamping plate in its various positions, and to accomplish that result, I conveniently provide a spring latch carried by the plate H, and adapted to be automatically thrust into locking engagement with teeth M or depressions, here constituted by a serrated face portion of the flange C, best seen in Fig. 4. The latch has its flat spring shank $l$ fastened, at the end thereof, to the exposed face of said plate, and with its depending nose or dog projecting inwardly through a suitable opening $l'$ provided therefor, in the plate, so that the effective locking point of said nose is normally resiliently thrust beyond the opposite face of the plate and into the successively engaged teeth M, as the plate is rotated.

The shank or stem of the latch may be formed or provided with a slightly arched portion or eye $l^2$ into which any suitable tool may be engaged to raise the latch and disengage the same from the teeth M, when it is desired to release the coupling.

In Figs. 5 and 6, the spring latch is shown as carried by the handle J and adapted to be automatically thrust into locking engagement with teeth constituted by a serrated peripheral portion $m$ of the flange C, best seen in Fig. 3. The latch has an operating lever N arranged parallel with the handle J, to be grasped therewith, the lever being fulcrumed as at $m'$ to the stem of the latch L', and rocking against a bearing $m^2$, through which said stem is passed, and depending from the clamping plate H, as shown in Fig. 6. This latch, however, may be a simple dog O, pivoted at $o$, below and parallel with the clamping plate, and provided with a finger engaging projection $o'$ to lift it out of engagement with the serrations or teeth, as shown in Fig. 7, the binding action of the parts being sufficient to hold the dog in locking position.

While I have herein disclosed several specific embodiments of my invention, it will be apparent to persons skilled in the art that the invention is capable of embodiment in still other forms and devices, as may be comprehended in the hereto appended claims.

I claim:—

1. A detachable coupling of the character described comprising members adapted to be coupled, one carrying an apertured flange, and the other carrying lugs adapted to pass through the openings in the flange and having beveled head portions adapted to project beyond the flange in combination with a wedge member interposed between the flange and a confining portion on the member which carries the same, said wedge member being adapted to be shifted to engage the beveled heads of the lugs, the wedge member being in the nature of a ring mounted for circumferential movement, and the wedge portions thereof being disposed approximately tangentially of the ring and arranged across one side thereof.

2. A detachable coupling of the character described comprising members adapted to be coupled, one carrying an apertured flange, and the other carrying lugs adapted to pass through the openings in the flange and having beveled head portions adapted to project beyond the flange in combination with a wedge member interposed between the flange and a confining portion on the member which carries the same, said wedge member being adapted to be shifted to engage the beveled heads of the lugs, the wedge member being in the nature of a ring mounted for circumferential movement, and said wedge portions being relatively broad across their engaging surfaces as compared to the beveled surfaces of the lugs.

3. A detachable coupling of the character described comprising members adapted to be coupled, one carrying an apertured flange, and the other carrying lugs adapted to pass through the openings in the flange and having beveled head portions adapted to project beyond the flange in combination with a wedge member interposed between the flange and a confining portion on the member which carries the same, said wedge member being adapted to be shifted to engage the beveled heads of the lugs, the wedge member being in the nature of a ring mounted for circumferential movement, the wedge portions thereof being disposed approximately at right angles to the ring, and said wedge portions being relatively broad across their engaging surfaces as compared to the beveled surfaces of the lugs and mounted upon one side of the ring whereby the same is rigidly supported.

4. The combination of members to be coupled, one carrying wedge portions and the other an apertured portion through which said wedge portions may project, a rotatable clamping ring carried by said last mentioned member through which said wedge portions may also project, the latter having nose portions facing in a direction the reverse of the direction of rotation of the clamping ring, and said clamping ring having wedge portions facing in the direction of said rotation adapted to engage said nose portions.

5. A detachable coupling of the class described, comprising opposed members adapted to be coupled, one of said members carrying an apertured portion and the other lugs adapted to pass through the apertured portion, the said lugs having beveled engaging surfaces and a clamping ring adapted to be interposed between the beveled surfaces of the lugs and the adjacent surface of the apertured flange portion, the said clamping ring being provided with a plurality of relatively wide wedge blocks beveled at their outer ends and adapted to engage the beveled surfaces of the lugs passing through the apertured flange to clamp the parts together.

6. A detachable coupling of the character described, comprising opposite members adapted to be coupled, one of said members carrying an apertured portion and another lugs adapted to pass through the said portion, said lugs having beveled engaging surfaces, a clamping member capable of a rotary movement arranged upon one of said members and provided with an elongated slot therethrough for the passage of the lugs, said clamping member having extending across one side thereof outstanding wedge blocks beveled at their outer portions and adapted to engage the beveled surface of the lugs to clamp the parts together, the wedge blocks extending substantially the entire distance across the face of the clamping ring whereby the same are rigidly supported.

7. A detachable coupling of the class described, comprising members adapted to be coupled, one carrying an apertured flange and the other carrying lugs adapted to pass through the openings in the flange and project beyond the flange, each of said lugs having transverse slots with beveled walls extending a part way therethrough, in combination with a clamping member arranged adjacent the apertured flange, said clamping member having relatively wide wedge blocks resting entirely on one side of the clamping ring and provided with beveled outer portions adapted to be shifted to engage the transverse beveled slots in the lugs to clamp the parts together.

8. A detachable coupling of the character described, comprising opposite members adapted to be coupled, one of said members carrying apertured portions and another lugs adapted to pass through the apertured portions, said lugs having beveled engaging surfaces, a clamping member arranged adjacent said apertured portion, and a series of wedge blocks mounted on the face of the said clamping member and of substantially the same width as the said face adapted to engage the beveled engaging surface of the lugs to clamp the parts together.

9. A detachable coupling of the character described, comprising opposite members adapted to be coupled, one of said members carrying an apertured portion and another a headed lug adapted to pass through the apertured portion, and a clamping member adapted to occupy a position between the head of the lug and the adjacent surface of the apertured portion to bind the parts together in combination with an automatic lock for securing the clamping members in adjusted position, said lock comprising a relatively flat spring thrust dog having its shank secured to the exposed face of the clamping member and extending along said face a portion of its length and its nose projecting through an opening therein and engaging stops on the face of the opposite coupling member.

10. A detachable coupling of the class described comprising members adapted to be coupled, one carrying an apertured flange and the other carrying lugs adapted to pass through the apertures in the flange and projecting beyond the flange, each of said lugs having beveled engaging surfaces, in combination with a clamping member arranged adjacent the apertured flange, said clamping member having relatively wide wedge blocks provided with beveled outer portions extending across its exposed side adapted to be shifted to engage the beveled engaging surfaces of the lugs to clamp the parts together.

11. A detachable coupling of the class described comprising members adapted to be coupled, one carrying an apertured flange and the other carrying lugs adapted to pass through the openings in the flange and projecting beyond the flange, each of said lugs being provided with engaging surfaces, in combination with a rotary clamping member arranged adjacent the apertured flange, said clamping member having a series of relatively wide wedge blocks provided with beveled outer portions being supported on one side of the clamping member and extending thereacross adapted to be shifted to engage the engaging surfaces of the lugs to clamp the parts together.

12. A detachable coupling of the class described, comprising members adapted to be coupled, one of said members carrying an apertured portion and the other lugs adapted to pass through the apertured portion, the said lugs having beveled engaging surfaces and a clamping ring adapted to be interposed between the beveled surfaces of the lugs and the adjacent surface of the apertured flange portion, the said clamping ring being provided with a plurality of relatively wide wedge blocks beveled at their outer ends and adapted to engage the beveled surfaces of the lugs passing through the apertured flange to clamp the parts together, the said wedge blocks being mounted on one side of the clamping ring and extending substantially thereacross whereby the wedge blocks are rigidly supported.

13. A detachable coupling of the character described, comprising opposed members adapted to be coupled, one of said members carrying apertured portions and the other lugs adapted to pass through the apertured portions, said lugs having beveled engaging surfaces, a clamping member arranged adjacent said apertured portion, and a series of wedge blocks mounted on one side of the clamping member and projecting at right angles thereto, the wedge lugs extending substantially the entire distance across the side of the clamping member to present relatively wide engaging surfaces adapted when shifted to interlock with the beveled surfaces of the lugs passing through the apertured flange.

14. A detachable coupling of the class described, comprising members adapted to be coupled, one carrying an apertured flange, and the other carrying lugs adapted to pass through the openings in the flange and project therebeyond, each of said lugs having transverse slots with beveled walls extending a part way therethrough, in combination with a clamping member arranged adjacent the apertured flange, the said clamping member having relatively wide wedge blocks disposed at right angles thereto and provided with beveled outer portions adapted to be shifted to engage the beveled walls of the lugs passing through the apertured flange.

15. The combination of relatively movable members to be coupled, one carrying wedge portions and the other apertured portions through which said wedge portions may project and having surfaces adapted to coact with said wedge portions upon relative movement of the members causing the wedge portions and said coacting surfaces to relatively ride each other, the latter having nose portions facing in the line of coupling movement, and the coacting wedge surfaces facing toward said nose portions, substantially as set forth.

16. The combination of relatively rotatable members to be coupled, one carrying wedge portions and the other apertured portions through which said wedge portions may project and having surfaces adapted to coact with said wedge portions upon relative movement of the members causing the wedge portions and said coacting surfaces to relatively ride each other, the latter having nose portions facing in the line of rotation of the coupling movement, and the coacting surfaces facing toward the nose portions, substantially as set forth.

17. The combination of relatively movable members to be coupled, one carrying wedge portions and the other apertured portions through which said wedge portions may project and having surfaces adapted to coact with said wedge portions, the latter having nose portions facing in the line of coupling movement, and the coacting wedge surfaces facing toward said nose portions, the apertured portions being closed and reinforced by surrounding marginal parts, substantially as set forth.

18. The combination of relatively rotatable members to be coupled, one carrying wedge portions and the other apertured portions through which said wedge portions may project and having surfaces adapted to coact with said wedge portions, the latter having nose portions facing in the line of rotation of the coupling movement, and the coacting surfaces facing toward the nose portions, the apertured portions being closed and reinforced by surrounding marginal parts, substantially as set forth.

In testimony whereof I hereunto affix my signature in the presence of two witnesses.

EDWARD F. BERRY.

Witnesses:
  Jos. H. Milans,
  L. S. Bacon.

Copies of this patent may be obtained for five cents each, by addressing the "Commissioner of Patents, Washington, D. C."